(No Model.) 4 Sheets—Sheet 2.

G. VALIANT.
MACHINE FOR CUTTING OUT SHOE FLIES.

No. 441,262. Patented Nov. 25, 1890.

Witnesses
Chas. J. Williamson.
Henry C. Hazard.

Inventor
George Valiant
by Prindle and Russell
his Attorneys (No Model.) 4 Sheets—Sheet 3.

G. VALIANT.
MACHINE FOR CUTTING OUT SHOE FLIES.

No. 441,262. Patented Nov. 25, 1890.

Witnesses
Chas. J. Williamson
Henry C. Hazard

Inventor
George Valiant
by Pruddle and Russell
his Attorneys (No Model.)  
4 Sheets—Sheet 4.

G. VALIANT.
MACHINE FOR CUTTING OUT SHOE FLIES.

No. 441,262.  
Patented Nov. 25, 1890.

Witnesses  
Chas. J. Williamson  
Henry C. Hazard

Inventor  
George Valiant  
by Prindle and Russell  
his Attorneys

UNITED STATES PATENT OFFICE.

GEORGE VALIANT, OF TORONTO, ONTARIO, CANADA.

MACHINE FOR CUTTING OUT SHOE-FLIES.

SPECIFICATION forming part of Letters Patent No. 411,262, dated November 25, 1890.

Application filed December 12, 1889. Serial No. 333,489. (No model.)

*To all whom it may concern:*

Be it known that I, GEORGE VALIANT, of Toronto, county of York, Province of Ontario, Canada, have invented certain new and useful Improvements in Machines for Cutting Out Flies for Boots and Shoes; and I do hereby declare that the following is a full, clear, and exact description thereof, reference being had to the accompanying drawings, in which—

Figure 1:
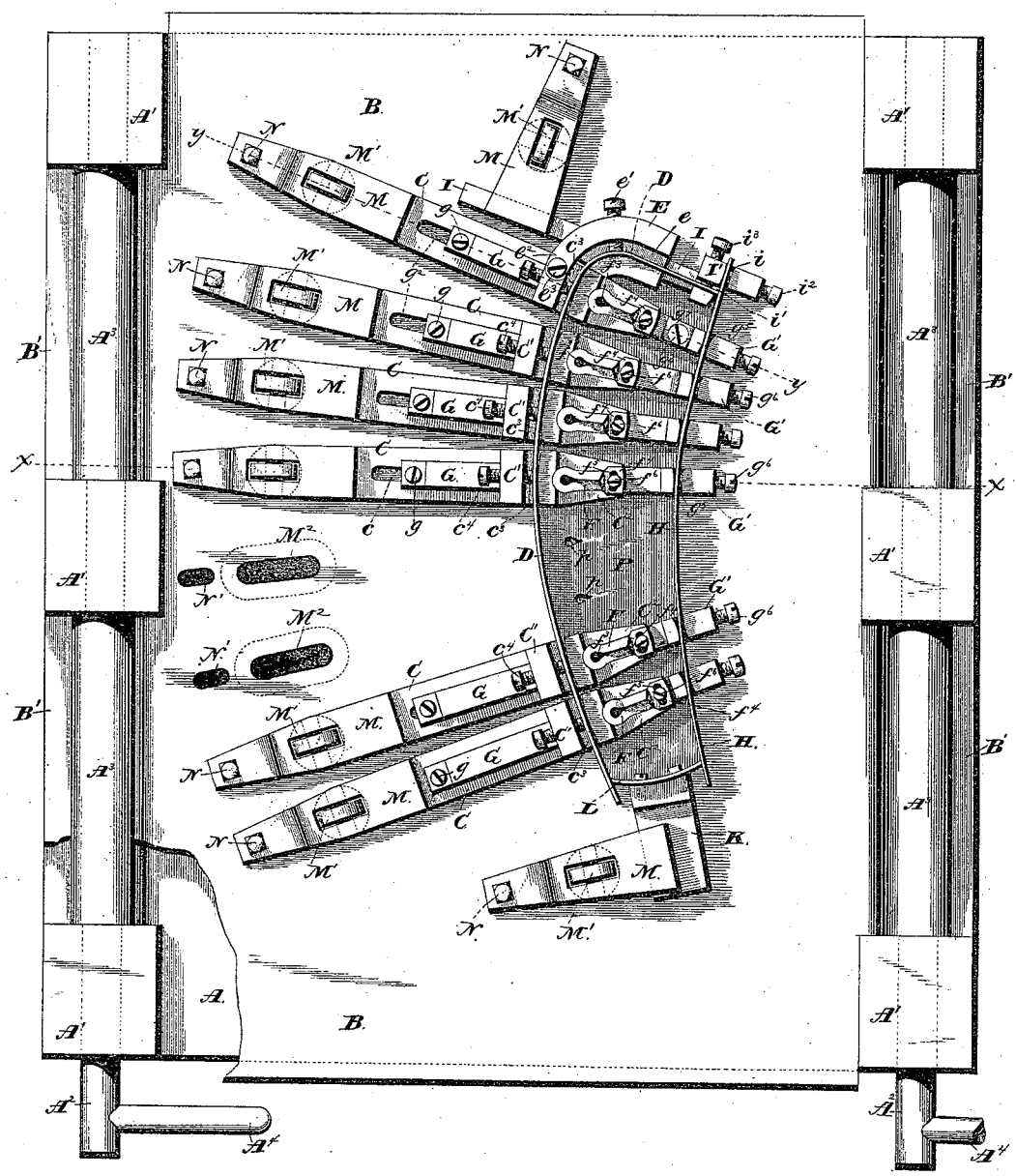
Figure 2:
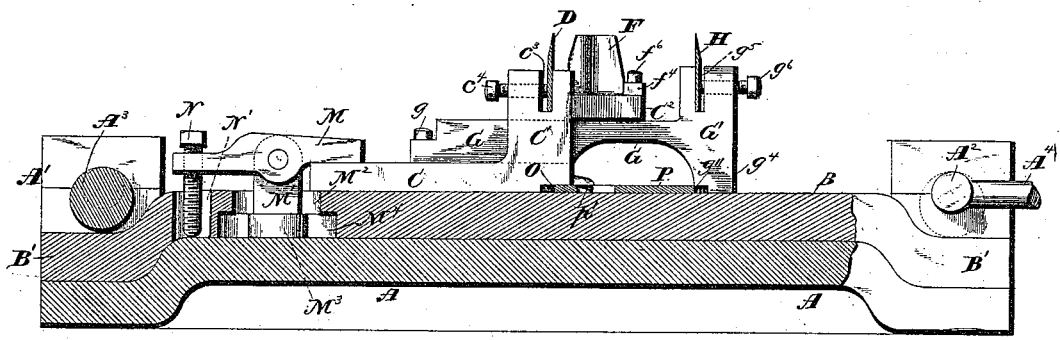
Figure 3:
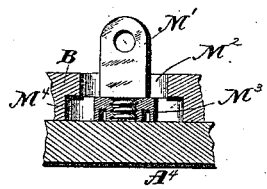
Figure 4:
Figure 5:
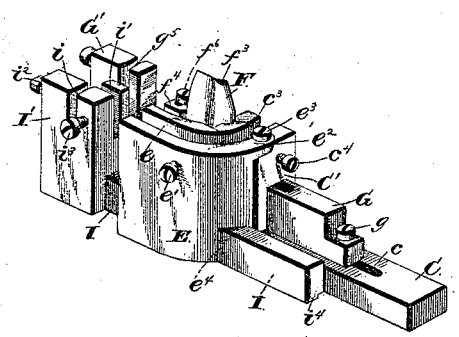
Figure 6:
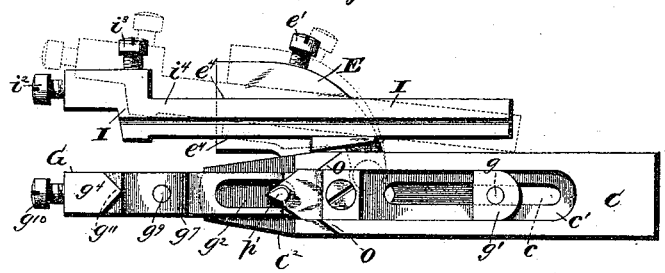
Figure 7:
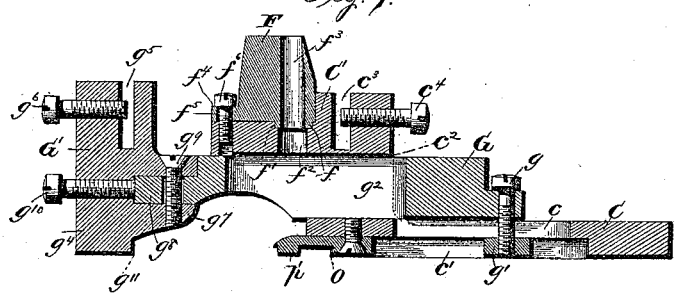
Figure 8:
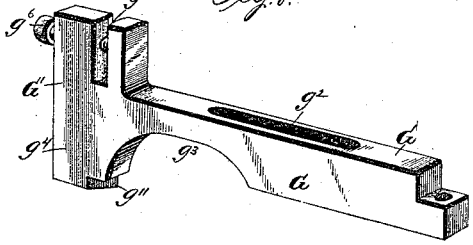
Figure 9:
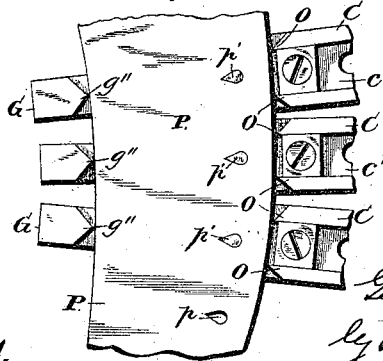
Figure 10:
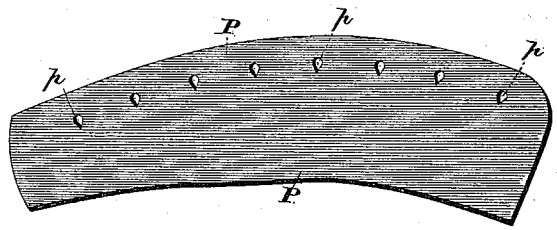
Figure 11:
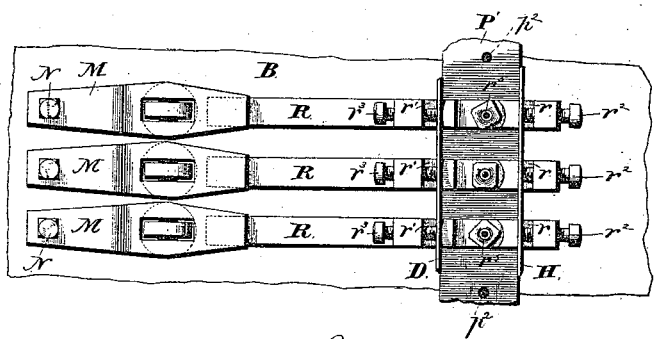
Figure 12:
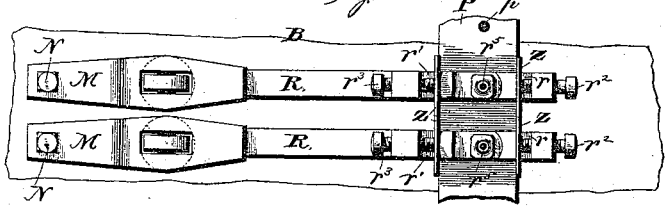
Figure 13:
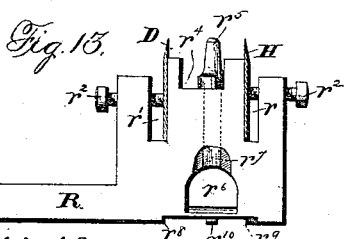
Figure 14:
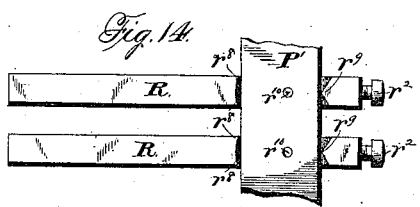

Figure 1 shows a plan view of my improved machine prepared for cutting a button-hole; Fig. 2, a transverse section of the same on line $x\,x$ of Fig. 1; Fig. 3, a detail sectional view showing the construction of the adjustable pivot used for the clamps; Fig. 4, a detail bottom plan view of the nut on the lower end of such pivot; Fig. 5, a detail perspective view of the part of the cutting devices for cutting the upper end portion of the fly; Fig. 6, a bottom plan view of such devices with the gage-fly or pattern-strip removed; Fig. 7, a view of a section on line $y\,y$ of Fig. 1; Fig. 8, a detail perspective view of one of the slides for holding the inner edge-cutting knife; Fig. 9, a detail bottom plan view of a portion of the machine, showing the gage-strip or pattern-fly determining the relative positions of the parts; Fig. 10, a plan view of the gage-fly or pattern-strip; Fig. 11, a plan view of my machine as adapted for cutting lace-hole strips; Fig. 12, a similar view with a different arrangement of knives for cutting the strip edges; Fig. 13, a view in elevation of one of the cutter-slides shown in Fig. 11; Fig. 14, a bottom plan view of two of such slides, showing the action of the gage or pattern strip.

Letters of like name and kind refer to like parts in each of the figures.

The object of my invention is to provide an improved machine for cutting out flies for boots and shoes; and to this end my invention consists in the machine and in the construction, arrangement, and combination of the parts thereof, as hereinafter specified.

In the drawings, A designates a table or support for the operative parts of my machine. On this table along each side thereof are fixed the blocks $A'\,A'\,A'$, forming journal-bearings, in which is journaled a shaft $A^2$, provided between the blocks with eccentric portions $A^3\,A^3$. All such eccentric portions on a shaft have their parts of greatest eccentricity on the same side of the shaft. Upon the end of each shaft is a handle $A^4$, by which the shaft can be rotated as desired.

Resting upon table or support A is the plate B, having portions $B'\,B'$ at each side projecting between the blocks or shaft-bearings $A'\,A'\,A'$ on plate A and under the eccentrics $A^3\,A^3$ on the shaft journaled in such bearings.

As shown in the drawings, the table or support A is depressed at each side, so as to leave the portions upon which are bearing-blocks $A'\,A'\,A'$ lower than the rest or main part of the table. The plate B is correspondingly formed, so as to fit the table. This depression of the sides of the table and plate brings the bearing-blocks $A'\,A'$ down out of the way below the level or plane of the edges of the cutters, to be described.

Resting on the plate B are the blocks C C, preferably one for each button-hole or lace-hole to be cut in the fly. In the machine as arranged for cutting button-hole flies each of these movable blocks has a flat elongated base resting upon the plate B and of sufficient length to allow it to be firmly engaged and clamped upon said plate by a clamp, to be described hereinafter. In this base is a longitudinal slot $c$, and on its under side is the longitudinal groove or way $c'$, made wider than the slot. On the inner end of the base of each block C is the upright portion or standard $C'$, provided with an opening or passage $c^2$, extending through it in a direction parallel with the slot $c$ in the block-base. In the top of such upright or standard is the transverse groove $c^3$, preferably having its inner wall slightly rounded or convex, as shown, and tapped through the outer side of such groove is the set-screw $c^4$. Resting in the grooves $c^3\,c^3$ in the series of block-uprights is the flexible knife D, held firmly in place by the set-screws clamping it against the middle points of the convex inner walls of the grooves, as shown in the drawings. This knife, whose edge is turned upward, is for cutting the outer edge of the fly. To give it the proper bend or curvature at the end where the upper end of the fly is to be cut I have provided the block E, having in its top the curved groove $e$ to receive and hold the knife at its bend or angle and the set-screw $e'$ to clamp the knife against the inner side of the groove. This block can be separate from the adjacent block C and be clamped to the plate B in any desired way; but I prefer to hinge it to such adjacent block, as shown, by means of an ear or lug $e^2$ and a pivot pin or screw $e^3$, passing through such lug into block C. In the bottom of this angle-block E is the way $e^4$, preferably rectangular in cross-section, extending in a direction parallel to the portion of the groove $e$ farthest from the block C, to which block E is hinged—that is, the groove $e^4$ in the bottom of the block takes the direction of the portion of groove $e$ beyond the bend or angle therein.

For cutting the required button-holes, each block C is provided with a button-hole cutter F, whose cutting-edge is of the well-known form and construction adapted for cutting both the slit and the enlargement of a button-hole. As shown, each of such cutters rests upon a horizontal arm or bracket $C^2$ on the inner side of the respective block standard or upright $C'$.

As it is sometimes desirable to vary the angle of the button-hole cutter with relation to the knife for cutting the outer edge of the fly, I make the cutter adjustable on its support. With this purpose in view the cutter is on its lower side provided with a round pivotal projection $f$, engaging a correspondingly-shaped recess $f'$ in the arm or support $C^2$. Such pivotal projection is vertically below the center of the loop in the cutter-edge, so that as the cutter is swung on its pivot the loop in the edge will be always the same distance from the edge-cutting knife. An opening $f^2$ is made down through the arm $C^2$ to a form a continuation of the vertical opening $f^3$ in the button-hole cutter for allowing downward and outward passage of the pieces cut from the fly. On the inner side of the base of the button-hole cutter is a lug $f^4$, provided with a slot $f^5$, concentric with the axis of rotation of the cutter, and passing through such slot into arm $C^2$ is the set-screw $f^6$, for fastening the cutter at any desired point of its swing. Passing through the opening $c^2$ in the upright $C'$ on each block C is the bar G, adapted to be adjusted longitudinally with reference to the base of block C. For fastening it at any desired adjustment a screw $g$ is provided, passing through a portion of the bar and down through the slot $c$. On the lower end of this screw is the nut $g'$, situated and fitting in the way $c'$, so as to be capable of sliding, but not turning, therein. With this construction, obviously, if the screw $g$ be loosened, the bar G can be moved longitudinally, and if it be tightened the bar will be clamped firmly to the block C.

The bar G, where it passes under the clearing-opening in the button-hole cutter and the cutter-supporting arm, is provided with a longitudinal slot $g^2$, adapted to always leave a clear passage for the chips or cuttings to work down and out whatever the adjustment of the bar may be. Each bar G is also arched or cut away on its under side at $g^3$ to allow ready removal of any chips or cuttings made during the use of the machine. Upon its farther end beyond such arched or cut-away portion each bar is provided with a downward extension or foot $g^4$ to rest upon the plate B and with an upright portion or standard $G'$ on its upper side. Such upright portion has in its upper end the transverse groove or slot $g^5$ to receive the flexible knife H for cutting the inner or attaching edge of the fly. A set-screw $g^6$, tapped through a portion of the upright and projecting into slot $g^5$, serves to clamp the knife in place against the side of the slot, which, like the sides of grooves $c^3 c^3$, is made slightly convex. The angle-block E is provided with a bar I, fitting and sliding in the way $e^4$ in the bottom of the block. Such bar, like bars G G, has an upright portion $I'$ on its upper side at its farther end. In the top of this upright portion is the transverse groove or slot $i$ for receiving the end of the flexible knife H, and also the groove or slot $i'$, substantially in line with the end of groove $e$ in the angle-block E and adapted to receive the end of knife D. A set-screw $i^2$ serves to clamp the end of knife H in slot $i$, while a similar screw $i^3$ serves a like purpose with relation to the end of knife D.

As shown in the drawings, while the rest of the bars G G are made in one piece, the bar with which the block C nearest the angle-block E is provided is formed differently. Its outer portion, comprising the slotted upright and the downward projection or foot, is hinged to the main part of the bar by means of two ears or lugs $g^7 g^7$, embracing a projection $g^8$ on the bar, and the pivot $g^9$, passing through such ears or projections. This construction allows the outer portion of the bar to be swung to stand at an angle to the main portion of the bar. To fasten it as adjusted by swinging on its pivot, I provide the set-screw $g^{10}$, tapped through the outer end of the swinging part of the bar and adapted to engage the end of the projection $g^8$ on the bar proper.

For cutting the lower end of the fly there is a block K, having the flat portion resting on plate B and the upright portion, to which is fastened by screws or in any desired way the short knife L, of the proper curvature to give the end of the fly the desired shape. To fasten the blocks C C in place as adjusted on the plate B, I provide the pivoted clamping-levers M, preferably one for each block. Each of these levers is pivoted to a standard $M'$, extending up through a slot $M^2$ in the plate and on its lower end tapped into a block or base $M^3$, resting on the table A. This base is, as shown, broader than slot $M^2$ and is situated in a groove $M^4$ on the under side of of the plate B. The slot and groove run in such direction as to allow the pivoted standard and base to be moved in toward the center of the plate B or outward, as desired. The base M³ is of such thickness that when the plate B is clamped down upon the table A, as hereinbefore described, the top of the groove or recess M⁴ engages the top of the base and clamps it firmly down in place on the table. The clamping-levers are then pivoted on adjustable fulcra. The inner end of each clamping-lever is adapted to engage the outwardly-extending base of one of the blocks C, so as to clamp it down firmly in place as adjusted on the plate B. To hold the clamping end of the lever down, its other end is provided with a screw N, tapped through the lever end and extending down through a slot N' in the plate B into engagement with the table A. A similarly constructed and acting clamp is provided for engaging the bar I in the groove in the bottom of the angle-block E and clamping such bar at any desired adjustment. The block K, carrying the short knife for cutting the lower end of the fly, is also clamped in place by a clamp just like those for the blocks C C and bar I. With my construction of blocks and clamps therefore, obviously, the blocks can be quickly and easily moved in or out on the table or swung to any desired angles with relation to each other and clamped to remain firmly as adjusted.

My machine, as shown and described, is especially intended for use in connection with gage or pattern strips, the idea being to have such patterns made of the desired shapes and the machine readily adjustable to such patterns, so as to cut out correspondingly-shaped flies. With this end in view I have provided each block C with two points or gage-lugs O O to engage the outer edge of the fly-pattern P on a line vertically below the portion of the fly-edge-cutting knife D carried by the respective block. Where the fly to be cut is a button-hole fly, the fly-pattern is provided with a series of holes $p$ $p$, each one corresponding in position with the enlarged portion or loop of a button-hole. Each block C is then provided with a stud $p'$, situated vertically below the loop portion of the button-hole cutter on the block, such stud being intended for engaging one of the holes $p$ $p$ in the pattern fly or strip. Each bar G is provided with a gage-point $g''$, situated vertically below the portion of knife carried by the respective bar and adapted to engage the inner or attaching edge of the pattern-fly. With this point in engagement with the fly edge the part of the knife H above the point must then be vertically above the pattern-fly edge. The under side of the bar I, connected with the angle-block E, has a longitudinal shoulder $i^4$, adapted to engage the upper end of the pattern-fly. Such shoulder is situated vertically below the part of the knife D held in the slot $i'$ in the standard I' on the bar. When the shoulder is in contact with the end of the pattern-fly, the knife above will be directly over the edge of such end and will be in position to cut a fly end precisely like that of the pattern-fly.

The hinged connection between the angle-block E and the adjacent block C allows such swinging of the former block and the bar I as to adjust the angle of the knife D at the upper end of the fly to any required degree.

As the angle between the edge of the upper end of a fly and the button-hole edge varies but little in different flies, much swinging of block E need not be provided for.

The operation of my machine as arranged for cutting button-hole flies for boots and shoes is as follows: The pattern-fly P, which can be of metal, wood, card-board, paper, or other material, having been prepared of the desired shape, with the proper arrangement of guide-holes for establishing the positions of the button-holes, it is laid on plate B. The blocks C C are then placed over it with the guide-points O O on their under sides engaging the outer side of the pattern-fly and the button-hole guide-studs $p'$ $p'$ engaging the guide-holes $p$ $p$ in said pattern. The bars are slid out or in until their gage points or lugs $g''$ $g''$ engage the inner edge of the pattern-fly, and are then fixed by tightening up the screws $g$ $g'$, clamping them to the blocks. The angle-block E is swung to bring its shoulder against the pattern-fly end, and the bar I is moved out or in to bring the knife-holding slot $i$ substantially in line with the corresponding slot in the bar G carried by the adjacent block C. As the blocks are adjusted in place, they are clamped securely in position on the plate B by the clamps already described hereinbefore. The block K, with the short knife L for cutting the lower end of the fly, is adjusted to position against the end of the pattern-fly, and is then clamped in such position by its respective clamp. With the series of guide points or studs O O on the blocks C C all in engagement with the outer edge of the pattern-fly the knife carried by the blocks will have the same curvature precisely as the outer edge of such fly. In the same way the knife H, carried by the uprights on the bars G G, will, when the guide-points on all the bars are in contact with the edge of pattern-fly, have precisely the curvature of the inner edge of such fly. If it is desired to alter the curvature of the knife H near the upper end of the pattern-fly from what it would be if the guide-point $g''$ on the bar was directly in line with the middle line of the bar G and block C, the hinged portion of the bar can be swung on its hinge and then fastened by the set-screw. With the two guide points or lugs O O on a block C engaging the curved outer edge of the pattern-fly and the button-hole guide-stud equidistant from such points, the button-hole can always be cut so as to be at right angles to the curvature of the portion of the fly between the guide points or lugs O O; or, if it be desired to change the angle of the button-hole, it can always be done with certainty, as desired, by a simple adjustment of the button-hole cutter on its pivotal connection with block C.

The button-hole at whatever angle cut will always be at the required distance from the fly edge. With the blocks and bars arranged as described and clamped on the plate B, if a sheet of leather be pressed down upon the cutters by a suitable plate or platen, a button-hole fly will be cut out of precisely the same shape, size, and configuration as the pattern-fly and having its button-holes all properly cut and in proper positions. When a lace-hole strip is to be cut with the lace-holes therein, a pattern-strip P' is used, made of metal, paper, or other desired material, of the shape of the required strip. In such pattern-strip there are the guide-holes $p'$ $p'$ for establishing the position of the lace-holes in the strip to be cut.

For cutting lace-hole strips I prefer to use the adjustable blocks R R, as shown in Figs. 11, 12, 13, and 14, instead of those shown in the other figures of the drawings. They are, as shown, made adjustable upon the plate B and clamped in position precisely as are the blocks C C described hereinbefore. They have, like blocks C C, the bases or extensions adapted to be engaged and held by the clamping-levers M M. As in lace-hole strips there is not the variation in width that there is in button-hole flies, the inner edge-cutting knife does not have to be held on a bar or block made adjustable with reference to the portion of the block carrying the outer edge-cutter. Each block R R is therefore provided in its top with the two transverse grooves or notches $r$ and $r'$ for receiving the outer and inner edge-cutting knives, respectively. Set-screws $r^2$ and $r^3$ are provided for clamping the knives in the respective notches. In a depression $r^4$ in the top of the block between the two knives is the punch or lace-hole cutter $r^5$, having its upper cutting end substantially on the same plane with the edges of the knives. In the block R, vertically below the punch $r^5$, is the opening $r^6$ for allowing the removal of chips or cuttings passing from the punch down through the opening $r^7$ in the block. The bottom of each block R is cut away or recessed to admit the pattern or guide strip P'. At the outer end of this recess, which is vertically under the edge of the knife which cuts the outer edge of the strip, are the two points $r^8$ $r^8$ to engage the pattern-strip edge, and at the inner end of the said recess is a single point $r^9$, equidistant from points $r^8$ and $r^8$, for engaging the inner edge of the pattern-strip. Between the guide-points $r^8$ $r^8$ and $r^9$ and on a line between point $r^9$ and the middle of the space between the two points $r^8$ $r^8$ is the stud or pin $r^{10}$ for engaging one of the guide-holes $p'$ in the pattern-strip. Such pin $r^{10}$ is vertically under the punch $r^5$, as shown.

I contemplate using on the blocks for cutting the outer and inner fly edges either the flexible form of knives D and H shown in Fig. 12 or a separate short knife $z$ in each slot $r$ $r'$ of the block. Such short knives, when the blocks R R are placed on the table or plate B side by side, will form continuous cutting-edges for cutting the whole of the outer and inner edges of the fly. With the two guide-points $r^8$ $r^8$ engaging the curved outer edge of the pattern-strip and the single point $r^9$ engaging the inner edge thereof the various blocks R R must conform in their relative positions to the curvature of the pattern-strip. The fly-edge-cutting knives will then have the exact curvature of the outer and inner edges, respectively, of the pattern-strip. With the pins $r^{10}$ $r^{10}$ engaging the guide-holes $p'$ $p'$ in the pattern-strip the respective punches $r^5$ $r^5$ above must be in position to punch lace-holes in the strip having the exact relative location of the guide-holes in the pattern-strip.

With my machine, as described and shown, button-hole flies and lace-hole strips can be cut of any size or configuration desired without the necessity of careful and laborious adjustment of the parts to prepare them for cutting the desired fly or strip. With the pattern for any fly or strip cut out, all that is necessary is to place the blocks over the pattern, bring the guide-points or shoulders into engagement with its edges and the hole-guide studs or pins into engagement with the guide-holes, and then clamp the blocks in place on the table. The machine is then ready to cut out a fly corresponding exactly with the pattern. The whole adjustment requires merely the moving of the parts to bring them properly into engagement with the pattern fly or strip and then the clamping or fastening such parts as adjusted.

The pattern flies or strips can be kept on hand in any number and variety to suit the needs of the manufacturer.

With a set of patterns, which can be most easily and cheaply made of any desired material, the boot or shoe manufacturer having my machine is prepared to cut out any shape of fly or lace-hole and any number of different shapes thereof without any necessity of delay or nice adjustment or change of his machinery. The walls of the grooves or slots in the blocks and bars against which the flexible knives are clamped by the set-screws are preferably made rounded or convex, as shown, in order to allow for considerable change in the curvature of the knives, as the blocks and bars are adjusted to different positions. The rounded convex form of such clamping-walls is, however, not necessary, as the curvature of the wall does not define the curve of the knife. The knife-clamping wall of the groove or slot in either block or bar can be cut away at any desired angle or to any degree on opposite sides of its central portion opposite the end of the respective set-screw.

Having thus described my invention, what I claim is—

1. In a machine for cutting leather, in combination with a suitable support and a pattern of the form to be cut out, a series of adjustable pieces having guides to engage the pattern and knives for cutting out the edges of the form carried by such pieces, substantially as and for the purpose specified.

2. In a machine for cutting leather, in combination with a suitable support, a series of adjustable blocks on such support provided with cutters for cutting out the edges of the form and having suitable guides adapted to engage a pattern of the form to be cut, so as to insure the proper position of the cutters to cut out a piece like the pattern, substantially as and for the purpose shown.

3. In a machine for cutting out button-flies or lace-hole strips, in combination with a suitable support and a pattern of the fly or strip having guide-openings to locate the holes to be cut in the fly or strip, a series of adjustable pieces on the support having guides to engage the pattern edges and guide-pins to engage the holes in the pattern, and the edge and hole cutters carried by the adjustable pieces, substantially as and for the purpose described.

4. In a machine for cutting out a button-hole fly or lace-hole strip, in combination with a suitable support, a pattern fly or strip having in it guide-holes to locate the holes to be cut, adjustable blocks on the support having guides to engage the outer edge of the pattern and lugs to engage the guide-holes in the latter, a flexible knife attached to the adjustable pieces, and cutters on such pieces for cutting the desired holes in the strip or fly, substantially as and for the purpose specified.

5. In a machine for cutting button-hole flies or lace-hole strips for boots and shoes, in combination with a suitable support, an adjustable block carrying a cutter to cut the edge of the fly or strip and a cutter to cut the desired hole in the same and provided with a guide to engage the edge of a pattern of the fly or strip, and a stud to engage a guide-hole in such pattern, substantially as and for the purpose set forth.

6. In a machine for cutting button-hole flies or lace-hole strips, a block carrying a cutter to cut the edge of the fly or strip and a cutter to cut the desired hole therein and provided with a guide adapted to engage the outer edge of a pattern of the fly or strip, such guide having two points to engage the pattern edge, and the guide lug or pin on the block equidistant from the two guide-points, adapted to engage a guide-hole in the pattern, substantially as and for the purpose described.

7. In a machine for cutting button-hole flies or lace-hole strips, a block provided with the two points to engage the edge of a pattern fly or strip and with a pin equidistant from such points to engage a guide-hole in such pattern, the edge-cutter supported on the block, and the cutter for cutting the desired hole in the fly or strip, situated in line with the pin on the block, substantially as and for the purpose specified.

8. In combination with the block provided with the guide adapted to engage the edge of a pattern at two different points, a cutter fastened to the block above such guide and parallel to a line connecting the pattern-engaging points of the latter, substantially as and for the purpose shown.

9. In combination with the flexible knife for cutting the outer edge of a button-hole fly, a series of adjustable knife-holding blocks on a suitable support, each having a guide adapted to engage a pattern-fly at two different points, and a pin equidistant from such points adapted to engage guide-holes in the pattern and the button-hole cutters on the block, substantially as and for the purpose described.

10. In a machine for cutting button-hole flies for boots and shoes, in combination with a cutter for cutting one edge of the fly, a block provided with a holder to engage such cutter and with a guide to engage one edge of a pattern-fly, a piece adjustably connected with the block having a guide to engage the other edge of the pattern, and a holder, and a cutter in such holder to cut the corresponding edge of the fly, substantially as and for the purpose specified.

11. In a machine for cutting button-hole flies, the adjustable block having a holder for an edge-cutting knife and the guide adapted to engage the outer edge of a pattern of the desired fly at two different points, the piece adjustably connected with such block having a holder for the knife for cutting the inner edge of the fly and a guide to engage the corresponding edge of the fly-pattern, and the two edge-cutting knives in the holders on the block and piece, substantially as and for the purpose shown.

12. In a machine for cutting button-hole flies, in combination with the two knives for cutting the edges of the fly, the block for supporting and holding the knife for cutting the outer edge of the fly, having the guide to engage the corresponding edge of a pattern of such fly, and a sliding bar longitudinally adjustable on the block, provided with a guide to engage the inner edge of the fly-pattern and with a holder for the inner edge-cutter, substantially as and for the purpose set forth.

13. In a machine for cutting button-hole flies, in combination with the outer and inner edge-cutting knives, a suitable support and a series of adjustable blocks thereon, each provided with a holder to receive the cutter for cutting the outer fly edge and with a guide to engage the outer edge of a pattern of the fly, the sliding bars adjustably connected with the blocks and each having a holder for the inner edge-cutting knife, and a guide to engage the inner edge of the pattern-fly, substantially as and for the purpose shown.

14. In a machine for cutting button-hole flies for boots and shoes, in combination with a suitable support, the series of adjustable blocks thereon, each having a guide to engage the outer edge of a pattern of the fly to be cut, the sliding bars adjustably connected with the blocks and each having a guide to engage the inner edge of the pattern-fly, the flexible knife attached to the blocks, and the similar knife attached to the bars, substantially as and for the purpose set forth.

15. In a machine for cutting button-hole flies for boots and shoes, in combination with a suitable support and the pattern-fly of the desired shape having holes to locate the button-holes, the adjustable blocks, each having a guide adapted to engage the outer edge of the pattern at two points and the pin or stud for engaging one of the guide-holes in the pattern, the sliding bars adjustably connected with the blocks and each having a guide to engage the inner edge of the pattern-fly, the flexible knife connected with and supported by the bars, and the flexible knife attached to the adjustable blocks, substantially as and for the purpose specified.

16. In combination with two cutters for cutting the fly edges and the button-hole cutter, the block carrying the cutter for cutting the outer edge of the fly and the button-hole cutter, and the sliding bar below the button-hole cutter, adjustably connected with the block and having the slot to allow passage of chips from the button-hole cutter and at its outer end adapted to receive and hold the cutter for cutting the inner fly edge, substantially as and for the purpose described.

17. In a machine for cutting button-hole flies, in combination with the two edge-cutting knives or cutters, the adjustable block to which the edge-cutting knife is attached, the sliding bar adjustably attached to the block, having its outer end, to which the other edge-cutting knife is attached, hinged, and a set-screw to fasten such end as swung on its hinge, substantially as and for the purpose specified.

18. In a machine for cutting button-hole flies for boots and shoes, in combination with the flexible knife for cutting the edge of the fly, the block having a holder for the knife, and the block hinged to such block having a knife-holder adapted to hold the knife bent at an angle, substantially as and for the purpose set forth.

19. In a mechanism for cutting button-hole flies, in combination with the flexible knife, the block having a holder for such knife, and the block hinged thereto and having a holder adapted to hold the knife bent at an angle to the portion held in the former block, and means for fastening the hinged block as adjusted on its hinge, substantially as and for the purpose described.

20. In combination with the flexible knife, the block having a surface to engage the side of the knife and a set-screw to force and hold the knife against such surface, and the block hinged to such other block having its knife-engaging surface curved to stand at an angle to the corresponding surface on such block and a set-screw to engage the knife, substantially as and for the purpose specified.

21. In combination with the flexible knife and the block having the curved holder to hold the knife bent at an angle, the bar sliding in a way in the block substantially parallel to the outer end of the curved knife-holder and having a holder to engage the end of the knife, and a guide-shoulder adapted to engage the end of a pattern of the piece to be cut, substantially as and for the purpose shown.

22. In combination with the block and the flexible knife attached thereto, the adjustable bar and the flexible knife attached to it, the block having the means for receiving and holding bent at an angle the flexible knife extending from the former block and the adjustable bar provided with a holder for the end of such knife, and a holder for the end of the knife attached to the other adjustable bar, substantially as and for the purpose set forth.

23. In a machine for cutting out forms from leather or other material, in combination with the cutters and holding devices for the same, a support for such devices, and clamps made adjustable over the support, adapted to clamp the cutter-holding devices at different points upon the support, substantially as and for the purpose set forth.

24. In a machine for cutting button-hole flies or lace-hole strips, in combination with the cutters and devices for holding the same, a support, a series of clamps for holding such devices on the support, and the adjustable standards upon which the clamps are pivoted and by which they are supported, substantially as and for the purpose specified.

25. In combination with the table or support and the plate resting thereon, provided with a series of slots undercut at their sides, the series of standards, each projecting through a slot and having a base wider than the slot, the series of clamps pivoted on such standards, and means for clamping the plate down on the table, so as to clamp the bases of the standards in place simultaneously, substantially as and for the purpose set forth.

In testimony that I claim the foregoing I have hereunto set my hand this 27th day of April, 1888.

GEORGE VALIANT.

Witnesses:
S. V. A. HUNTER,
ELMER P. HOWE.